United States Patent Office 3,761,393
Patented Sept. 25, 1973

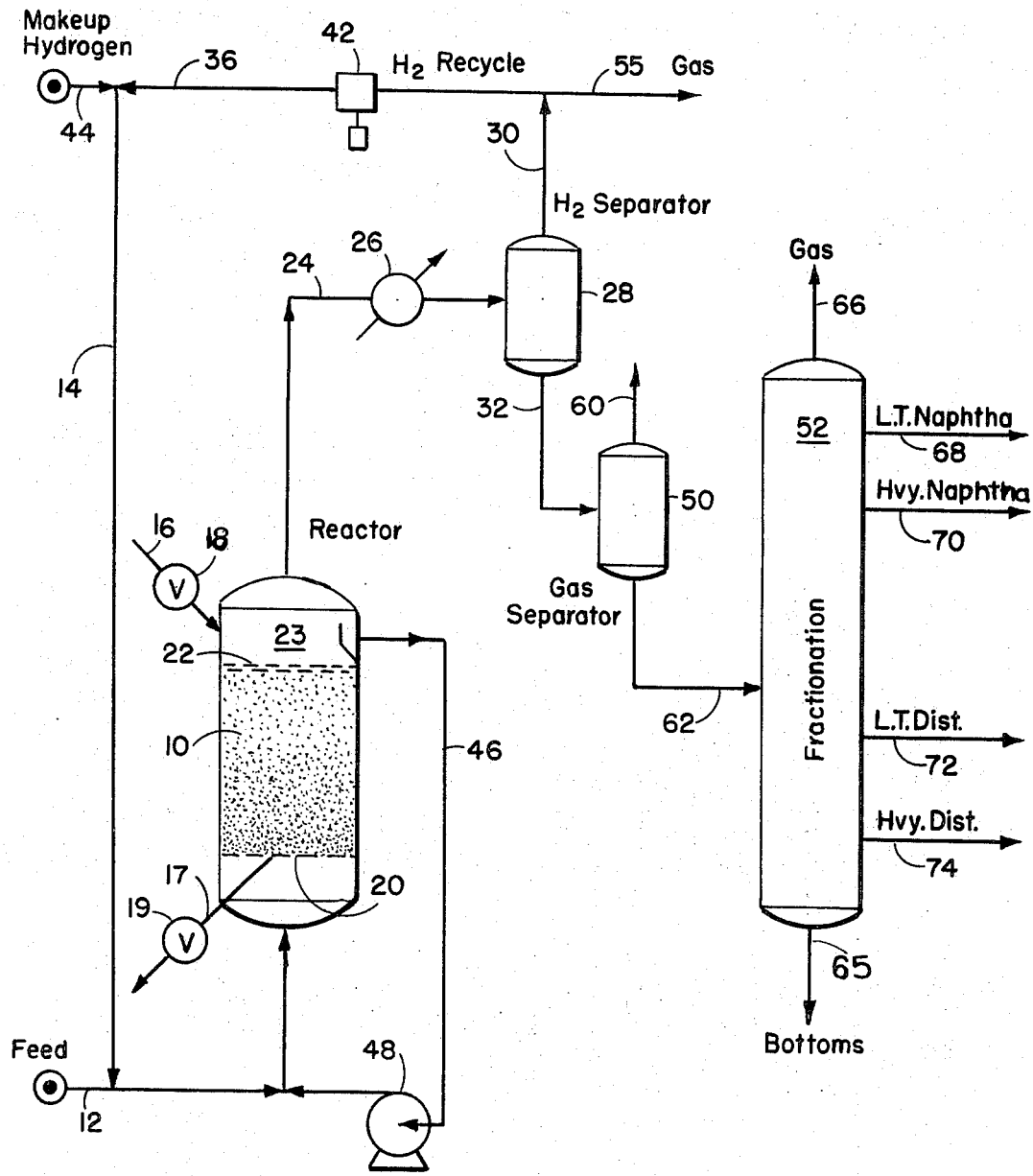

3,761,393
HIGH CONVERSION LEVEL HYDROGENATION
Ronald H. Wolk, Trenton, and Michael C. Chervenak, Pennington, N.J., and Seymour B. Alpert, Los Altos, Calif., assignors to Hydrocarbon Research, Inc., New York, N.Y.
Filed Mar. 17, 1972, Ser. No. 235,750
Int. Cl. B01j *11/82;* C10g *13/02*
U.S. Cl. 208—108
3 Claims

ABSTRACT OF THE DISCLOSURE

Hydrodesulfurization catalysts which are normally manufactured for use in the hydroconversion of residual oils to lighter boiling products consist of mixtures of relatively porous and relatively nonporous catalyst particles as a function of the manufacturing procedure. In the ebullated process, for high conversion level operations, there is a critical limit to the amount of nonporous catalyst particles that can exist in a mixture before the defluidization of the catalyst system occurs. In using microspheroidal or extrudate catalyst, the amount of nonporous catalyst contained in the catalyst bed to the unit is limited to about 10% before defluidization of the catalyst system sets in when operating at conversion levels exceeding 60%.

BACKGROUND OF THE INVENTION

In doing research on the high conversion of residual oils to lighter boiling products as in the ebullated bed process disclosed by Johanson in U.S. Reissue Pat. No. 25,770, with conversion above 60%, defluidization was a commonly noted phenomena. This defluidization appears to be caused by the sticking together of asphaltene-like molecules which are present on the surface of nonporous catalysts. The amount of nonporous catalyst that can be tolerated within a given reaction system is obviously a function of the type of feed oil, the conversion which is to be attained and the macroporosity of the catalyst. In attempting to get high conversions of residuum to lighter boiling products in a hydroconversion reactor, there are large amounts of heavy asphaltenic molecules generated which adhere to the catalyst surface. If the catalyst surface is not sufficiently porous, these molecules remain on the outside of the catalyst and stick to other molecules attached to other nonporous catalyst particles. This causes defluidization of the ebullated bed of catalyst which is accomplishing the hydroconversion.

In manufacturing catalyst, it has been found that particles of catalyst are, in fact, not uniform. It has not been obvious heretofore that the particle-to-particle variations within a batch of manufactured catalyst has had any significant part in determining whether the system is operable or inoperable. In general, the only inspections which manufacturers are concerned with are those dealing with the average bulk catalyst properties of the catalyst.

SUMMARY OF THE INVENTION

We have now determined that there is a critical limit as to the amount of nonporous particles that can be allowed to be injected into an operating bed of cobalt molybdate or similar hydrogenation catalyst in which a hydroconversion reaction is being carried out. It is necessary to carefully control the amount of the nonporous catalyst particles that are present in the catalyst being added to the ebullated bed system. The average properties of the catalyst particles which meet and do not meet the criteria for porosity or penetrability are not grossly different. The density, promoter level, total pore volume and surface area are about the same for acceptable and unacceptable catalyst. We have found, however, that it is extremely critical, in order to prevent reactor defluidization when using an ebullated catalyst bed, to minimize the amount of nonpenetrable catalyst being added as makeup catalyst.

The object of this invention is to prevent defluidization by a particulate bed of catalyst, whether of the extrudate or microspheroidal type.

DESCRIPTION OF THE DRAWING

The drawing is a schematic view of the reactor and associated equipment for a hydrogenation process.

DESCRIPTION OF THE PREFERRED EMBODIMENT

As described in U.S. Patent to Alpert et al., No. 3,412,010, a typical ebullated bed system for hydrocracking, which is particularly applicable to hydroconversion, including hydrodesulfurization and hydrocracking of residuum includes a reactor 10 of the upflow ebullated bed type such as disclosed in the Johanson U.S. Reissue Pat. No. 25,770 to the bottom of which is fed a mixture of a residuum 12 together with recycle hydrogen in line 14.

As taught in the Johanson patent, above referred to, the reactor may have a liquid distributor and catalyst support 20 so that the liquid and gas passing upwardly through the reactor 10 will tend to put catalyst in random motion. While the catalyst may be added to the line 14, it is preferably added through an external feed line 16 under control of valve 18. Catalyst can be withdrawn through line 17 under control of valve 19.

The catalyst particle size range is usually narrow for uniform expansion under controlled liquid and gas flow conditions. While the overall range is usually between ⅛ inch and 325 mesh (U.S.S.), we contemplate a so-called once through operation using catalyst in the 100–200 mesh range with a liquid velocity in the order of 5–10 gallons per minute per square foot of horizontal reaction space. Alternatively, larger catalyst, usually in the ½₂ inch size, can be used by adequate recycle of heavy oil from the top to the bottom through the grid to provide from about 40 to 60 gallons total liquid per minute per square foot of horizontal reaction space. It is also possible, of course, to use catalyst in the 40–80 mesh range by proper selection of the liquid rate and the other relative operating variables.

By control of the catalyst particle size and density and liquid and gas velocities and taking into account the viscosity of the liquid and the lifting effect of the hydrogen under the operating conditions, the catalyst bed may be expanded to have a definite level or interface indicated at 22 in the liquid. It will be apparent that the settled level of the catalyst, as when the liquid rate drops below a catalyst sustaining value, will be considerably lower than level 22. Normally, bed expansion should be at least 10% and seldom over 300% of the static level, and the liquid rate will be usually in the range of 1 to 100 gallons per minute per square foot of horizontal cross section of the reactor.

In a reactor of this type, we provide a vapor space 23 from which a vapor overhead completely free of liquid, is removed at 24. This may be conveniently cooled and partially condensed in heat exchanger 26 and separated in separator 28 into a gaseous portion removed overhead at 30, and a liquid portion removal at 32. The gaseous portion 30, which is largely hydrogen, may be purified by conventional means and after being reheated, can be recycled through compressor 42 to the feed line 14 to the reactor. Fresh or makeup hydrogen is added at 44.

Circulation of liquid from above the interface 22 to below the distributor deck 20 is usually desirable to assure completeness of the reaction and to establish a sufficient upflow liquid velocity to assist in maintaining the catalyst in random motion (ebullated) in the liquid.

This is preferably accomplished by the use of a conduit 46 and pump 48 to assure a positive and controlled movement of the liquid. As described in the aforementioned Johanson patent, recycle can be established by an internal pump. However, with the finer catalyst, a once-through operation is possible.

The liquid portion 32 from separator 28 is flashed in gas separator 50 with an overhead leaving in 60 and then passed via 62 to be fractionated in distillation column 52 into fractions boiling in the gasoline range (overhead) in 66, kerosene and diesel oil (side streams) in 68, 70, 72, 74, and a heavy gas oil with a boiling range between 680° F. to 975° F. in line 65.

In the operation of the foregoing process on a variety of residuum stocks, catalysts were supplied by a number of manufacturers of commercial catalysts of the particulate hydrogenation type. It became apparent, however, that as the conversion of the 975° F. plus material increased above about fifty percent, many of the runs terminated prematurely due to coke formation.

It was thus determined to test catalyst in advance to predetermine its probable operability.

The percent penetration of extruded catalysts is measured by the following procedure:

(a) about 40 particles are obtained by quartering and riffling a large sample of catalyst;
(b) the particles are immersed in a solution consisting of 50 weight percent benzene and 50 weight percent Kuwait vacuum residuum (7.5° API, 24 volume percent on crude) for ten minutes;
(c) the particles are withdrawn from the solution and placed on a porous paper towel to absorb excess solution;
(d) the particles are cut to expose the radial cross section;
(e) each particle is examined microscopically to determine the percentage of the diameter into which the residual oil has diffused;
(f) the percentage of particles having less than 10% penetration (diffusion of heavy oil) of the diameter is then calculated.

With microspheroidal catalyst the following procedure is used:

(a) one gram of catalyst is obtained by quartering and riffling a large sample of catalyst;
(b) (same as "b" in example above);
(c) (same as "c" in example above);
(d) the particles are then mounted in a liquid plastic which hardens to preserve the particles;
(e) the plastic is carefully ground off to expose the full diameter of all particles;
(f) the percentage of the diameter into which the heavy oil has diffused is then measured;
(g) the percentage of particles having less than 10% penetration of the diameter is then calculated.

It was then concluded that with commercially available hydrogenation catalysts that when the proportion of catalyst particles having less than 10% penetration by the foregoing test exceeded about 35%, excessive coke deposits resulting from the agglomeration of the nonporous portion of the catalyst particles. On the other hand, no substantial difficulty was found with composite batches when the amount of substantially nonporous particles having less than 10% penetration did not exceed 35%.

Example I

A wide variety of extrudates catalyst samples were tested for the conversion of Kuwait vacuum bottoms. Extrudates are cylindrical particles having a length to diameter ratio ranging from one to ten. Conversion is defined as the volume percent disappearance of the 975° F. feed fraction into lighter boiling products. For example if the feed to a given operation contained 90 volume percent of material boiling above 975° F., and the product from that operation contained 45 volume percent material boiling above 975° F. the conversion would be 50% The properties of these catalyst particles and the results of the tests are summarized in Table I. Operations were successful at conversions of 75 percent when the amount of particles having less than 10% penetration as defined previously was limited to less than about 35%. With other more difficult feeds typified by those with a higher content of asphaltenic molecules and higher amounts of vanadium and nickel compounds or at higher levels of conversion, it is thought that the level of particles having less than 10% penetration should not exceed 10%.

Example II

Comparable experiments were made on processing Kuwait vacuum bottles at 85 percent conversion with two different samples of 100–200 mesh cobalt molybdate on alumina microspheroidal catalyst. The difference in the catalyst was limited to the percentage of particles having penetrations less than 10%. In the first case indicated by column "A" in Table II, the catalyst had only 5 percent of particles having less than 10% penetration. Operations were successful on this catalyst with no defluidization occurring. Hoever, a second test, indicated by column "B" in Table II, was carried out with a catalyst having 14 percent of the particles with less than 10% penetration. Operations were unsatisfactory and defluidization was noted after a short on stream time.

TABLE I.—OPERABILITY TEST RESULTS

| Catalyst | Operability test results | Percent of particles with <10% penetration | Percent of catalyst | | | |
|---|---|---|---|---|---|---|
| | | | $SiO_2$ | Mo | Co | Ni |
| A1 | P | 31 | 0.1 | 12 | 3 | |
| A2 | P | 19 | 0.7 | 12.8 | 3.4 | |
| A3 | P | 26 | 0.1 | 12.5 | 3.5 | |
| A4 | P | 30 | 0.9 | 13.8 | 3.6 | |
| B1 | F | 100 | 3.0 | 14.4 | 3.2 | |
| B2 | F | 91.1 | | | | |
| B3 | F | 100 | 3.5 | 14.0 | | 6.0 |
| B4 | F | 100 | <0.1 | 18.0 | 3.3 | |
| B5 | F | 83 | <0.1 | 15.2 | 3.2 | |
| B6 | P | 0 | <0.1 | 15.8 | 3.0 | |
| B7 | P | 12 | <0.3 | 15.0 | 3.0 | |
| B8 | P | 12 | 0.3 | 15.0 | 3.0 | |
| C1 | F | 100 | 1.4 | 13.0 | 3.8 | |
| C2 | F | 100 | 1.0 | 12.4 | | 5.5 |
| C3 | F | 100 | 2.0 | 15.2 | 5.6 | |
| C4 | P | 33 | 0.3 | 12.9 | 3.7 | |

NOTE.—P=Passed: Operable. F=Failed: Inoperable. All catalysts had a base of $Al_2O_3$

TABLE II

| | Column | |
|---|---|---|
| | A | B |
| Catalyst: | | |
| Size | (1) | (1) |
| Type | (2) | (2) |
| CoO, wt. percent | 2.7 | 2.7 |
| $MoO_3$, wt. percent | 13.8 | 13.8 |
| Pore volume, cc./g | 0.59 | 0.59 |
| Surface area, $M.^2/g$ | 267 | 267 |
| Percent of particles with less than 10% penetration | 5 | 14 |
| Operating results at 85% conversion | (3) | (4) |
| Temperature, °F | 837 | 837 |
| Hydrogen partial pressure, p.s.i.g | 2,250 | 2,250 |
| Space velocity v. oil/hr./v. reactor | 0.46 | 0.46 |

[1] 100–200 mesh microspheres.
[2] CoMo on alumina.
[3] Excellent.
[4] Reactor coking due to defluidization observed.

NOTE.—Feed: Kuwait vacuum bottoms; 7.5° API, 5.5% S. 90 volume percent boiling above 975° F.

Microspheroidal catalysts usually have a diameter range of 30 mesh to 200 mesh (United States Sieve Series). Extrudates, on the other hand, are usually of a length from 1/8 to 1/4 inch with a diameter from 1/32 to 5/64 inch. The ratio of length to diameter is about 2 to 6.

While we have shown and described a preferred form of embodiment of our invention, we are aware that modifications may be made thereto within the scope and spirit of the description herein and of the claims appended hereinafter.

We claim:

1. The process of hydrogenating and hydrocracking a reduced crude having at least 25 volume percent boiling above 975° F. in which the crude at a temperature in the range of 750–900° F. and a pressure in the order of 1000–5000 p.s.i.g. together with at least 2500 s.c.f./bbl. of hydrogen is passed upwardly through a reaction zone, in the presence of a hydrogenation-type catalyst having a narrow size range, said range falling between 1/8 inch and 325 mesh and in which the flow velocities of liquid and hydrogen upwardly through the catalyst are such as to expand the bed of catalyst at least 10% over the settled-state volume and to maintain the catalyst in random motion in the liquid; with the space velocity of the liquid being such as to accomplish more than 50% conversion of the 975° F. plus boiling components in the feed and to partially remove sulfur; and from the effluent of the reaction zone a gas phase and a liquid phase are removed:

the improvement which comprises utilizing a porous catalyst which has no more than 10% of its particles having less than 10% penetration.

2. The process of claim 1 wherein the catalyst is an extrudate having a longer dimension between 0.06 inch and 0.25 inch and a cross section dimension approximately one quarter to one-half the longer dimension.

3. The process of claim 1 wherein the catalyst is microspheroidal having a diameter between 0.01 inch and 0.10 inch.

References Cited

UNITED STATES PATENTS

| | | | |
|---|---|---|---|
| 2,635,749 | 4/1953 | Schmitkons et al. | 209—127 |
| 2,688,401 | 9/1954 | Schmitkons et al. | 209—172 |
| 3,418,234 | 12/1968 | Chervenak et al. | 208—59 |
| 3,640,817 | 2/1972 | O'Hara | 208—59 |

DELBERT E. GANTZ, Primary Examiner

G. E. SCHMITKONS, Assistant Examiner

U.S. Cl. X.R.

208—112, 146, 153, 157; 252—477 R